United States Patent
Schreiber

(10) Patent No.: US 9,429,026 B2
(45) Date of Patent: Aug. 30, 2016

(54) DECOUPLED COMPRESSOR BLADE OF A GAS TURBINE

(71) Applicant: Rolls-Royce Deutschland Ltd & Co KG, Blankenfelde-Mahlow (DE)

(72) Inventor: Karl Schreiber, Am Mellensee (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 543 days.

(21) Appl. No.: 13/953,952

(22) Filed: Jul. 30, 2013

(65) Prior Publication Data

US 2014/0030107 A1  Jan. 30, 2014

(30) Foreign Application Priority Data

Jul. 30, 2012 (DE) .................... 10 2012 015 136 U

(51) Int. Cl.
*F01D 5/14* (2006.01)
*F01D 5/30* (2006.01)
*F04D 29/32* (2006.01)

(52) U.S. Cl.
CPC ............. *F01D 5/147* (2013.01); *F01D 5/30* (2013.01); *F04D 29/324* (2013.01); *F05D 2240/303* (2013.01); *Y02T 50/671* (2013.01); *Y02T 50/673* (2013.01)

(58) Field of Classification Search
CPC .......... F01D 5/14; F01D 5/141; F01D 5/147; F01D 5/30
USPC ........................................................ 416/224
See application file for complete search history.

(56) References Cited

U.S. PATENT DOCUMENTS

| 3,294,366 | A | * | 12/1966 | Coplin | F01D 5/147 415/216.1 |
| 6,004,101 | A | * | 12/1999 | Schilling | F01D 5/28 416/219 R |
| 7,399,159 | B2 | * | 7/2008 | Matheny | F01D 5/147 416/219 R |
| 7,744,346 | B2 | * | 6/2010 | Schreiber | F01D 5/141 416/223 R |
| 7,780,419 | B1 | * | 8/2010 | Matheny | F01D 5/005 416/221 |
| 8,137,073 | B2 | | 3/2012 | Giusti et al. | |
| 2010/0129651 | A1 | | 5/2010 | Schreiber | |

FOREIGN PATENT DOCUMENTS

| DE | 1628355 | 10/1970 |
| DE | 102008058786 | 5/2010 |
| EP | 1908919 | 4/2008 |

OTHER PUBLICATIONS

German Search Report dated Apr. 24, 2013 from counterpart application.

* cited by examiner

*Primary Examiner* — Nathaniel Wiehe
*Assistant Examiner* — Woody Lee, Jr.
(74) *Attorney, Agent, or Firm* — Timothy J. Klima; Shuttleworth & Ingersoll, PLC

(57) ABSTRACT

The present invention relates to a compressor blade of a gas turbine having an airfoil made of a fiber-reinforced plastic, which is fastened by means of a blade root to a disk, as well as a metallic leading-edge element, which is arranged on the leading-edge side of the airfoil and partially encompasses the latter, with the leading-edge element itself being fastened to the disk.

19 Claims, 4 Drawing Sheets

Figure 1:
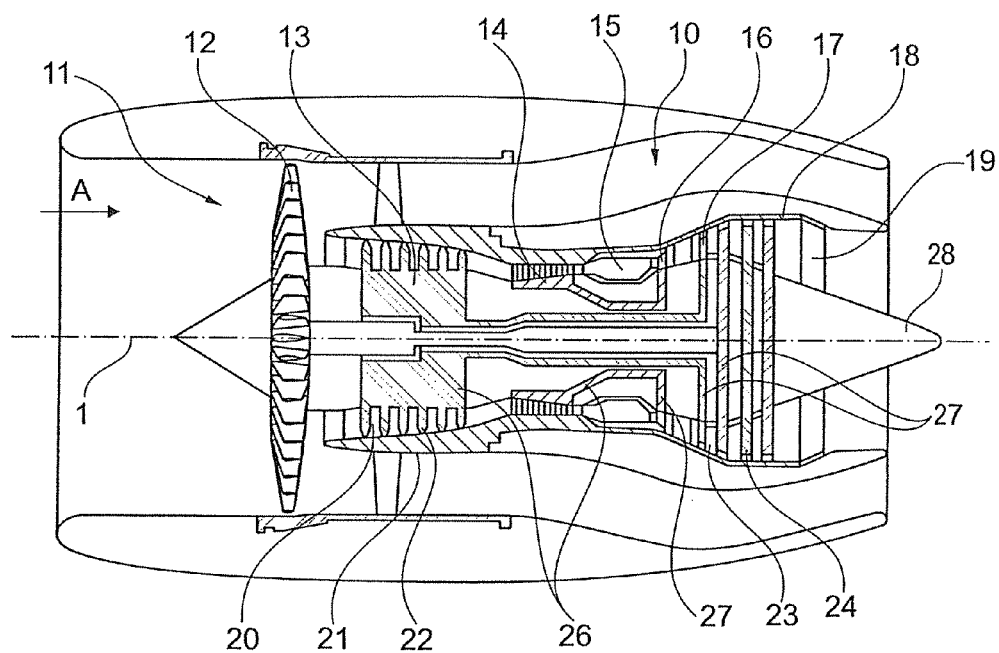

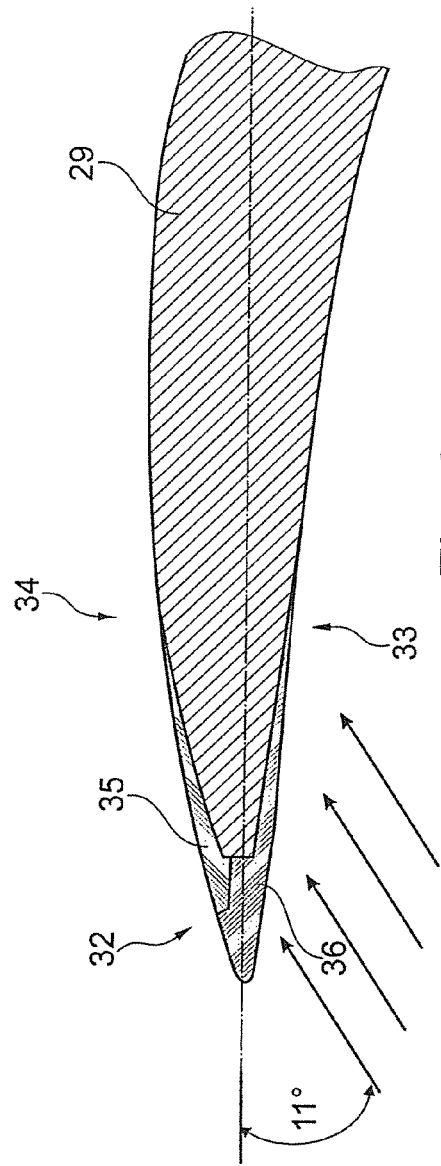
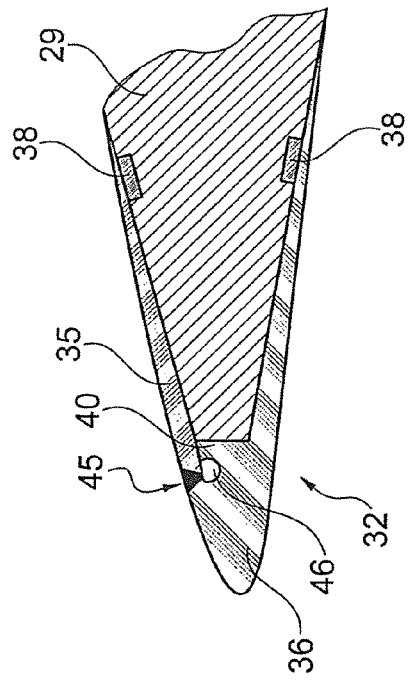
Fig. 6
Fig. 5

DECOUPLED COMPRESSOR BLADE OF A GAS TURBINE

This application claims priority to German Patent Application 10 2012 015 136.5 filed Jul. 30, 2012, the entirety of which is incorporated by reference herein.

This invention relates to a compressor blade of an aircraft gas turbine having an airfoil made of a fiber-reinforced plastic. The invention is however also applicable to a stationary gas turbine.

It is known from the state of the art to cast or forge compressor blades for aircraft gas turbines, in particular for fans, from metallic materials. However, compressor blades made of fiber-reinforced plastics, for example carbon fiber-reinforced plastics, are increasingly being used.

With these fiber-reinforced plastic airfoils for compressor blades, erosion prevention for the leading edge and protection of the leading edge from mechanical stresses and damage are proving to be particularly critical. These mechanical stresses can be caused by, for example, bird strike or by ingested dust particles or stones. The material of the fiber-reinforced airfoil is not optimized for these stresses, with the result that the state of the art shows leading-edge elements of metallic materials, for example titanium alloys, which are intended to protect the airfoil from damage.

Aircraft gas turbines and compressor blades are often designed with a very complex geometry, for example heavily twisted or, in the case of fans of aircraft gas turbines, in crescent shape. With regard to the metallic leading-edge element, the result is high demands on service life, strength, applicability and manufacturing costs. Due to the very complex geometry of the compressor blades themselves, it is necessary to provide the leading-edge element too with a corresponding design of a complex geometry. In view of the manufacturability of these leading-edge elements, the geometries of the compressor blades often cannot be aerodynamically optimized.

The adhesive connection provided in the state of the art between the leading-edge element and the airfoil has proven to be another weak spot in terms of service life and manufacturability. In particular, the comparatively very high G-forces of the heavier leading-edge element are transmitted via the adhesive connection into the material structure of the airfoil made of fiber-reinforced plastic and routed from there into the blade root. The differing physical properties of the metallic leading-edge element and of the airfoil made of fiber-reinforced plastic have a detrimental effect here, particularly with regard to the thermal expansion coefficient and the differing moduli of elasticity, as well as with regard to the anisotropy of the airfoil made of fiber-reinforced plastic. In the case of the expansion coefficient, it must be noted in particular that fiber-reinforced plastics contract when heated while metallic materials expand when heated.

The object underlying the present invention is to provide a compressor blade of an aircraft gas turbine, in particular a compressor blade of a fan of an aircraft gas turbine, which, while being simply designed and easily and cost-effectively producible, avoids the disadvantages of the state of the art and features high functionality and a long service life.

It is a particular object to provide solution to the above problem by a combination of features described herein. Further advantageous embodiments will become apparent from the present description.

In accordance with the invention, it is thus provided that the compressor blade is designed in two parts. Firstly, it includes an airfoil made of a fiber-reinforced plastic which is fastened by means of a blade root to a disk of the compressor or of the fan. In addition to this, a leading-edge element is provided in accordance with the invention which forms an independent component and partially encompasses the airfoil at its leading edge. In accordance with the invention, the leading-edge element itself is fastened and mounted on the disk, meaning it is suspended in a decoupled manner.

In accordance with the invention, therefore, the forces occurring, in particular the centrifugal forces of both the airfoil and the leading-edge element, are transmitted separately into the disk, so that the airfoil made of fiber-reinforced plastic does not have to absorb the additional forces and stresses of the leading-edge element. There is thus a structural decoupling of the metallic component (leading-edge element) and the component made of fiber-reinforced plastic (airfoil).

In accordance with the invention, the leading-edge element extends into the root of the compressor blade and thus permits direct anchoring on the disk, regardless of the structure of the airfoil made of fiber-reinforced plastic.

In accordance with the invention, there is no adhesive connection between the leading-edge element and the airfoil. These adhesive connections continually prove to be problematic, since the alloys used in particular for leading-edge elements of this type, for example titanium alloys, can only be bonded to a limited extent.

The leading-edge element in accordance with the invention is substantially of U-shaped design in its cross-section and contacts the surface of the airfoil with its sides with a pretension. A relative movement is possible here and leads to vibration dampening when the compressor blade is deformed, so that the latter has a higher stability. The risk of a failure of the compressor blade is thus considerably reduced. It must be noted here in particular that in the event of a failure there will never be a simultaneous fracture of both the leading-edge element and the airfoil, so that in the event of a failure of only one of the two components the other will remain functional.

Due to better dampening, crack formation which can occur in the state of the art is prevented in the leading-edge element. The blades are aerodynamically excited to vibrations, and these are among the main mechanisms causing damage to the blades. These vibrations are effectively reduced by this decoupled design.

To improve the corrosion resistance of the airfoil, it can be advantageous to avoid a direct contact between the two materials in the area of contact between the leading-edge element and the airfoil. To achieve electrical insulation, it can be favourable to position a layer of glass fiber-reinforced plastic onto the airfoil made of a carbon fiber-reinforced plastic in the contact area.

In accordance with the invention, therefore, a high degree of dampening of the compressor blade itself results, since adhesive bonding between the leading-edge element and the airfoil can be dispensed with. The manufacturing steps are also simplified by dispensing with this bond. Furthermore, it is possible to design the leading-edge element with a very complex geometry, which is not possible in solutions known from the state of the art where the leading-edge element is attached to the airfoil and has to be bonded (adhesively) thereto.

The good dampening achieved in accordance with the invention and resulting from friction between the leading-edge element and the airfoil also leads to the advantage that the two components (leading-edge element and airfoil) can retain their own natural frequencies. This prevents flutter of the compressor blade, since the differing natural frequencies cause a relative movement of the two components.

In a particularly favourable embodiment of the invention, it is provided that the leading-edge element is constructed from a first and a second partial element, which are connected to one another for example by means of a laser welding method or by means of a positive connection method, for example by means of bolts, screws or the like. This opens up the possibility of producing the two partial elements with a very complex geometry, for example by forging or shaping. Here too, the result is a substantial reduction of the manufacturing costs as well as of the assembly costs. In accordance with the invention, it is possible to place the two partial elements of the leading-edge element onto the airfoil and suitably pretension them before these two partial elements are connected by welding or by means of mechanical elements. In the case of connection by means of a welding method, for example by a laser welding method, this results in the advantage that the heat transfer into the material of the airfoil can be kept very low, so that it is not negatively affected by the joining process.

Since in accordance with the invention the two sides of the leading-edge element, substantially U-shaped in cross-section, contact the surface of the airfoil with a pretension and encompass the latter, it is possible to produce the partial elements of the leading-edge element with a large or very large tolerance, as production tolerances are compensated by the pretension.

In accordance with the invention, it can be favourable to arrange in the joining area of the first partial element and of the second partial element an inflow-edge element made of an erosion-resistant material, for example of high-manganese steel or Stellite, and hence obtain a self-sharpening design of the leading edge.

Since the embodiment in accordance with the invention leads to the airfoil not having to absorb any additional forces due to the leading-edge element, it is possible to design the airfoil itself more slender and aerodynamically optimized. In all, the result is a lower weight of the compressor blade in accordance with the invention. This is particularly advantageous especially for fan blades. Due to the increased specific loading capacity, use in smaller engines with, for example 20,000 lbs take-off thrust, is also conceivable.

A further substantial advantage in an embodiment in accordance with the invention of a fan blade is that the design has a lower failure risk. As already explained, it can be substantially ruled out that both the airfoil and the leading-edge element fail simultaneously. As a result, it is possible that no fan blade-off failure case occurs at all. This allows a substantially lighter and smaller-dimensioned fan containment to be provided, since substantially lower impact energies have to be absorbed. A further advantage of the decoupled concept is that simultaneous failure of the metallic and fiber-reinforced components is not to be expected, further reducing the kinetic energy in the event of failure.

In a favourable embodiment of the invention, it is possible to arrange friction elements which increase dampening between the leading-edge element and the airfoil. These friction elements can be designed in the form of friction strips. Furthermore, it is possible to insert dampening elements which increase the dampening effect in particular in the inflow-side area in the event of an impact by a foreign body and hence protect the airfoil.

Additionally, it is possible to provide axial positive securing means to couple the leading-edge element to the airfoil.

In accordance with the invention, it is thus provided that the metallic leading-edge element and the fiber-reinforced airfoil are designed for independent introduction of G-forces, decoupled from one another, into the disk.

Figure 2:
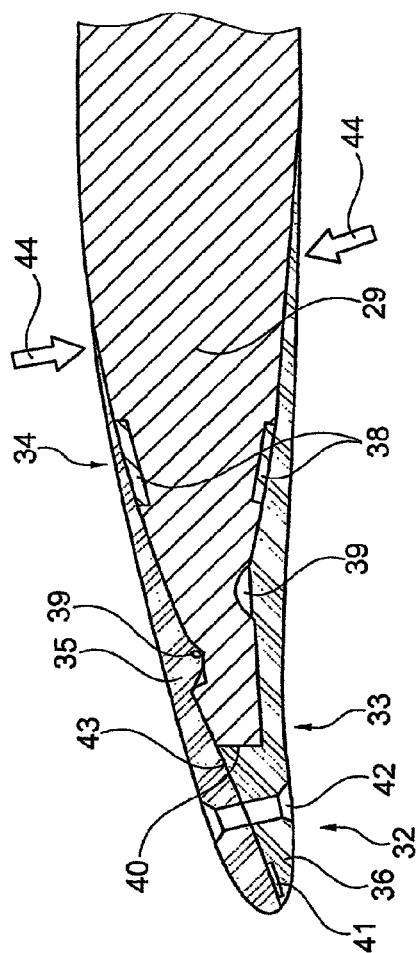
Figure 4:
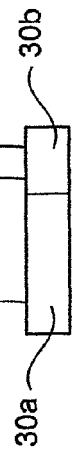
Figure 3:
Figure 7:
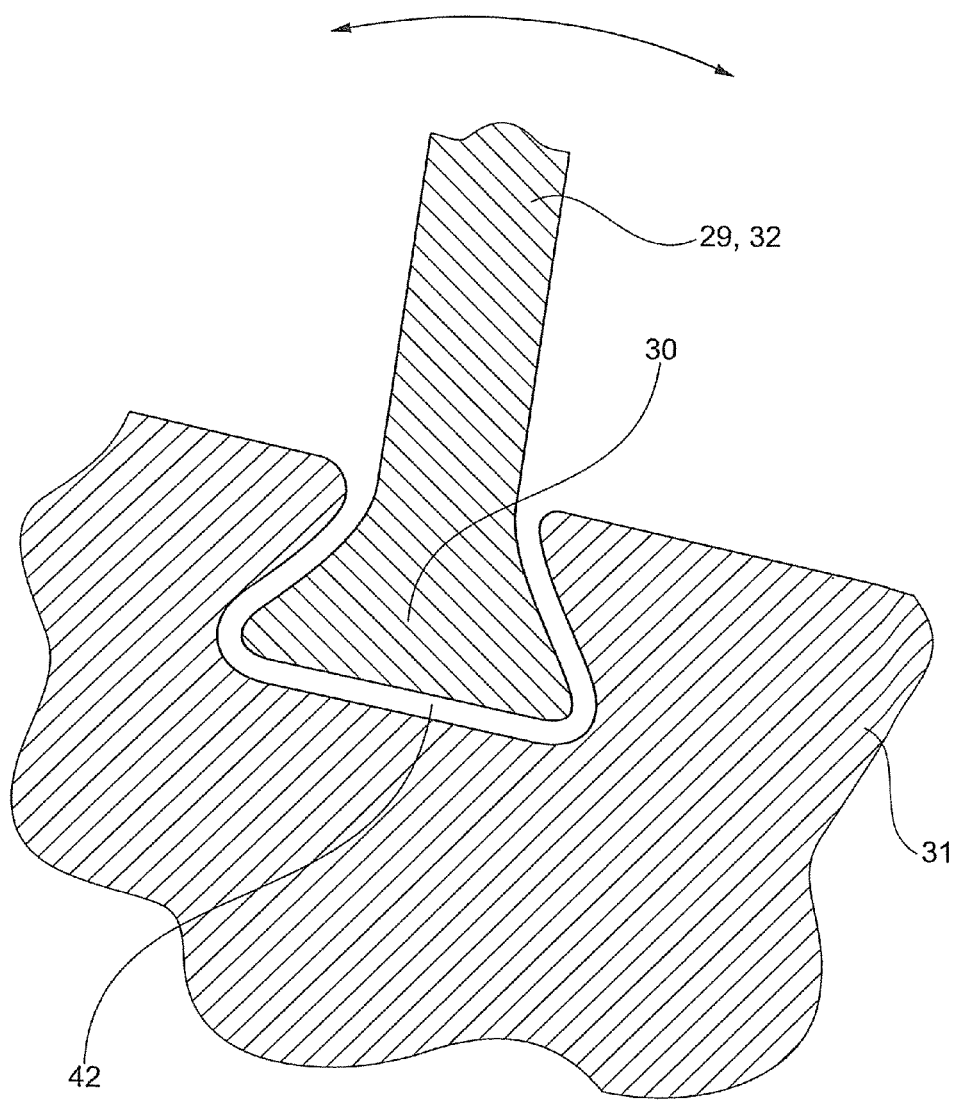

The present invention is described in the following in light of the accompanying drawing, showing exemplary embodiments. In the drawing, FIG. 1 shows a schematic representation of a gas-turbine engine in accordance with the present invention, FIG. 2 shows a partial sectional view of an exemplary embodiment of a compressor blade in accordance with the present invention, FIGS. 3 and 4 show simplified side views onto the pressure side and the suction side of a compressor blade in accordance with the present invention, FIG. 5 shows a sectional view, by analogy with FIG. 2, of a further exemplary embodiment, FIG. 6 shows a further sectional view, by analogy with FIGS. 2 and 5, of a further exemplary embodiment of the invention, and FIG. 7 shows a schematic representation of the blade root and of the disk.

The gas-turbine engine 10 in accordance with FIG. 1 is a generally represented example of a turbomachine where the invention can be used. The engine 10 is of conventional design and includes in the flow direction, one behind the other, an air inlet 11, a fan 12 rotating inside a casing, an intermediate-pressure compressor 13, a high-pressure compressor 14, a combustion chamber 15, a high-pressure turbine 16, an intermediate-pressure turbine 17 and a low-pressure turbine 18 as well as an exhaust nozzle 19, all of which being arranged about a central engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIG. 2 shows a partial sectional view of an airfoil 29 in accordance with the invention which is made of a fiber-reinforced material, for example a carbon fiber-reinforced material. A leading-edge element 32 is arranged on the inflow side of the airfoil 29, and is designed substantially U-shaped in cross-section and made up of a first partial element 35 and a second partial element 36. In the exemplary embodiment shown, these are connected by means of bolts or rivets 37. In the area of the inflow edge, an inflow-edge element 41 is arranged in the area of a separating line 43 between the first partial element 35 and the second partial element 36.

The arrows 44 show a pretensioning force with which the two end areas of the partial elements 35 and 36 contact the surface of the airfoil 29.

Between the airfoil 29 and the partial elements 35 and 36, friction elements 38 are arranged and can for example be designed in the form of friction strips. A dampening element 40 is shown at the airfoil corner area on the inflow side and serves to dampen an impact load.

The reference numeral 33 designates the pressure side of the compressor blade, while the reference numeral 34 designates the suction side.

Furthermore, FIG. 2 shows in schematic form positive securing means 39 which effect additional axial securing.

FIGS. 3 and 4 each show a schematic side view of the compressor blade in accordance with the invention onto the pressure side (FIG. 3) and onto the suction side (FIG. 4). In particular it is shown here that the airfoil 29 is connected to a blade root 30 and that the leading-edge element 32 is likewise connected to a blade root 30. On the pressure side (FIG. 3), the leading-edge element 32 extends into the blade root 30 or merges into it, while on the suction side the leading-edge element 32 can end before the blade root 30.

FIG. 7 shows a schematic representation of a disk 31 with a recess 42 in which the blade root 30 is anchored. The double arrow shows that a relative movement or vibration can occur between the airfoil 29 or the leading-edge element 32 and the disk 31. This relative movement likewise leads to dampening.

FIG. 5 shows an exemplary embodiment in which the partial elements 35 and 36 are connected by means of a weld 45. Additionally, a cavity 46 is provided to ensure complete weld penetration.

FIG. 6 shows in a clear representation the flow onto the compressor blade in accordance with the invention, which preferably takes place at an angle of 11° to the central axis.

From the representations, in particular of FIGS. 2 and 6, it can be seen that the axial longitudinal extent of the leading-edge element on the pressure side is longer than on the suction side, with a greater material thickness being provided on the pressure side. This improves the anchoring of the leading-edge element on the blade root 30 at the pressure side, as is shown in FIG. 3.

The leading-edge element 32 is connected to the airfoil 29 preferably only after application on the airfoil 29.

The leading-edge element may for instance be made of a titanium alloy, of Ti 6/4 for example.

LIST OF REFERENCE NUMERALS

1 Engine axis
10 Gas-turbine engine/core engine
11 Air inlet
12 Fan
13 Intermediate-pressure compressor (compressor)
14 High-pressure compressor
15 Combustion chamber
16 High-pressure turbine
17 Intermediate-pressure turbine
18 Low-pressure turbine
19 Exhaust nozzle
20 Guide vanes
21 Engine casing
22 Compressor rotor blades
23 Stator vanes
24 Turbine blades
26 Compressor drum or disk
27 Turbine rotor hub
28 Exhaust cone
29 Airfoil
30 Blade root
31 Disk
32 Leading-edge element
33 Pressure side
34 Suction side
35 First partial element
36 Second partial element
37 Connecting element/bolt/rivet
38 Friction element
39 Positive securing means
40 Dampening element
41 Inflow-edge element
42 Recess
43 Separating line
44 Pretensioning force
45 Weld
46 Cavity

What is claimed is:

1. A compressor blade system of a gas turbine comprising:
a rotor disk;
a compressor blade, comprising:
an airfoil made of a fiber-reinforced plastic and including a pressure side surface, a suction side surface, a leading edge and a blade root, the airfoil attached to the rotor disk by the blade root,
a metallic leading edge element arranged on the leading edge and partially encompassing the leading edge,
the leading edge element being attached to the rotor disk separately from the airfoil and at least partially decoupled from the airfoil to allow relative motion in a radial direction with respect to the rotor disk between the leading edge element and the airfoil.

2. The compressor blade system in accordance with claim 1, wherein the leading edge element contacts the pressure side and the suction side and clamps the airfoil with a pretension.

3. The compressor blade system in accordance with claim 2, wherein the leading edge element contacts the airfoil in a direction of an axis of the compressor blade.

4. The compressor blade system in accordance with claim 1, wherein the leading edge element includes a radially extending first partial element and a radially extending second partial element connected to one another.

5. The compressor blade system in accordance claim 4, and further comprising an inflow edge element arranged in an area of an inflow side of the compressor blade between the first partial element and the second partial element.

6. The compressor blade system in accordance with claim 4, and further comprising at least one chosen from a laser weld joint and a positive connecting element connecting the first partial element and the second partial element to one another.

7. The compressor blade system in accordance with claim 1, and further comprising at least one friction element arranged between the leading edge element and the airfoil.

8. The compressor blade system in accordance with claim 1, wherein the leading edge element is positively connected to the airfoil.

9. The compressor blade system accordance with claim 1, and further comprising at least one dampening element arranged in an area of an inflow side of the compressor blade between the airfoil and the leading edge element.

10. The compressor blade system in accordance with claim 1, wherein the leading edge element is connected to the airfoil only after application on the airfoil.

11. The compressor blade system in accordance with claim 1, wherein the compressor blade is a fan blade of a fan of an aircraft gas turbine.

12. The compressor blade system in accordance with claim 1, wherein the leading edge element contacts the airfoil in a direction of an axis of the compressor blade.

13. The compressor blade system in accordance with claim 12, wherein the leading edge element includes a radially extending first partial element and a radially extending second partial element connected to one another.

14. The compressor blade system in accordance with claim 13, and further comprising an inflow edge element arranged in an area of an inflow side of the compressor blade between the first partial element and the second partial element.

15. The compressor blade system in accordance with claim 14, and further comprising at least one friction element arranged between the leading edge element and the airfoil.

16. The compressor blade system in accordance with claim 15, wherein the leading edge element is positively connected to the airfoil.

17. The compressor blade system in accordance with claim 16, and further comprising at least one dampening element arranged in an area of an inflow side of the compressor blade between the airfoil and the leading edge element.

18. A compressor blade system of a gas turbine comprising:
   a rotor disk;
   a compressor blade, comprising:
      an airfoil made of a fiber-reinforced plastic and including a pressure side surface, a suction side surface, a leading edge and a blade root, the airfoil attached to the rotor disk by the blade root,
      a metallic leading edge element arranged on the leading edge and partially encompassing the leading edge,
      the leading edge element being attached to the rotor disk separately from the airfoil;
      the leading edge element including a radially extending first partial element and a radially extending second partial element connected to one another;
      an inflow edge element arranged in an area of an inflow side of the compressor blade between the first partial element and the second partial element.

19. A compressor blade system of a gas turbine comprising:
   a rotor disk;
   a compressor blade, comprising:
      an airfoil made of a fiber-reinforced plastic and including a pressure side surface, a suction side surface, a leading edge and a blade root, the airfoil attached to the rotor disk by the blade root,
      a metallic leading edge element arranged on the leading edge and partially encompassing the leading edge,
      the leading edge element being attached to the rotor disk separately from the airfoil for independent introduction of forces, decoupled from one another, into the disk.

* * * * *